(12) United States Patent
Battaglia, Jr.

(10) Patent No.: US 7,988,451 B2
(45) Date of Patent: Aug. 2, 2011

(54) INJECTION TRAINING PAD

(75) Inventor: Anthony J. Battaglia, Jr., Greene Township, PA (US)

(73) Assignee: Pocket Nurse Enterprises, Inc., Ambridge, PA (US)

(*) Notice: Subject to any disclaimer, the term of this patent is extended or adjusted under 35 U.S.C. 154(b) by 491 days.

(21) Appl. No.: 12/182,520

(22) Filed: Jul. 30, 2008

(65) Prior Publication Data

US 2009/0035737 A1    Feb. 5, 2009

Related U.S. Application Data

(60) Provisional application No. 60/952,932, filed on Jul. 31, 2007.

(51) Int. Cl.
*G09B 23/28* (2006.01)
(52) U.S. Cl. ......... 434/267; 434/262; 434/268; 434/272
(58) Field of Classification Search .......... 434/262, 434/267, 268, 272
See application file for complete search history.

(56) References Cited

U.S. PATENT DOCUMENTS

| | | | | | |
|---|---|---|---|---|---|
| 2,871,584 | A | * | 2/1959 | Poole | 434/268 |
| 2,995,832 | A | * | 8/1961 | Alderson | 434/268 |
| 3,339,290 | A | * | 9/1967 | Doyle | 434/267 |
| 4,136,466 | A | * | 1/1979 | Wrue | 434/271 |
| 4,481,001 | A | * | 11/1984 | Graham et al. | 434/267 |
| D292,932 | S | * | 11/1987 | McGinley | D19/62 |
| 4,789,340 | A | * | 12/1988 | Zikria | 434/272 |
| 5,727,948 | A | * | 3/1998 | Jordan | 434/267 |
| 5,775,916 | A | * | 7/1998 | Cooper et al. | 434/267 |
| 7,534,107 | B2 | * | 5/2009 | Bardsley et al. | 434/272 |
| 7,866,984 | B1 | * | 1/2011 | Jawalekar | 434/268 |

* cited by examiner

*Primary Examiner* — Gene Kim
*Assistant Examiner* — Joseph B Baldori
(74) *Attorney, Agent, or Firm* — The Webb Law Firm (57) ABSTRACT

Disclosed is an injection training pad that allows a user to practice intradermal, subcutaneous and intramuscular injections all on the same device. The injection training pad includes a container having an open top and a closed bottom. A lid having a hole removably engages the open top of the container. The pad also includes a retaining member having a base with at least one leg. At least a portion of the retaining member is disposed within the container. A cap having a flange is positioned between the retaining member and the lid, and a cushion is positioned between the retaining member and the cap.

19 Claims, 6 Drawing Sheets

INJECTION TRAINING PAD

CROSS REFERENCE TO RELATED APPLICATIONS

This application claims the benefit of U.S. Provisional Application No. 60/952,932, filed Jul. 31, 2007, the entire contents of which is hereby incorporated by reference.

BACKGROUND OF THE INVENTION

1. Field of the Invention

The present invention relates to an injection training pad and, more particularly, to an injection training pad to be used for practice in administering various types of injections with needles and syringes in educational settings.

2. Description of Related Art

Over the years, different devices have been used to train medical doctors, nurses, paramedics and the like to use needles to administer injections to patients. Historically, oranges were a popular choice to use for such training due to their peels and inner pulp roughly simulating skin on top of muscle tissue. More recently, various types of mannequins and pads have been developed to better simulate the different layers of skin, muscle and bone tissue. Desirably, injection practice devices should enable users to practice a variety of different types of injections. Such devices can sometimes be cost prohibitive due to the expense of materials and the manufacturing of life-like training pads or mannequins.

SUMMARY OF THE INVENTION

The present invention is directed to an injection training pad that allows a user to practice intradermal, subcutaneous and intramuscular injections all on the same device. In one embodiment, the injection training pad includes a container having an open top and a closed bottom. A lid having a hole removably engages the open top of the container. The pad also includes a retaining member having a base with at least one leg. At least a portion of the retaining member is disposed within the container. A cap having a flange is positioned between the retaining member and the lid, and a cushion is positioned between the retaining member and the cap. The lid may include a lip extending from an inner surface of a top portion of the lid and the retaining member may include a lip extending from a top surface of the base of the retaining member. The cap may also include a top portion extending from the flange through the hole of the lid. A guard may be provided for engagement with a recess on a top surface of the lid such that the guard encloses the top portion of the cap. The cap may have a cavity defining an inner surface of the cap and at least a portion of the cushion is disposed within the cavity of the cap.

DESCRIPTION OF PREFERRED EMBODIMENTS

The present invention will now be described with reference to the accompanying figures. For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is to be understood that the specific system illustrated in the attached figures and described in the following specification is simply an exemplary embodiment of the present invention. Hence, specific dimensions and other physical characteristics related to the embodiments disclosed herein are not to be considered as limiting.

Figure 1:
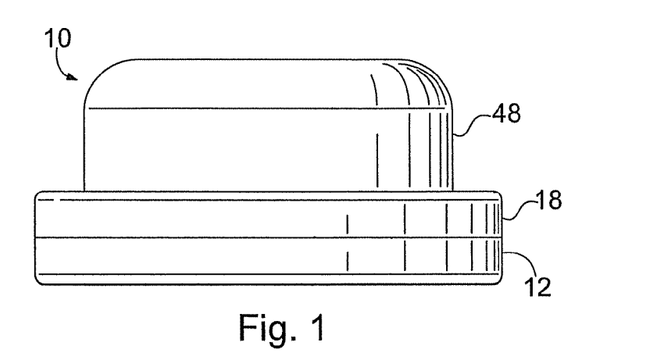
FIG. 1 is a side view of one embodiment of an injection training pad in accordance with the present invention.
Figure 2:
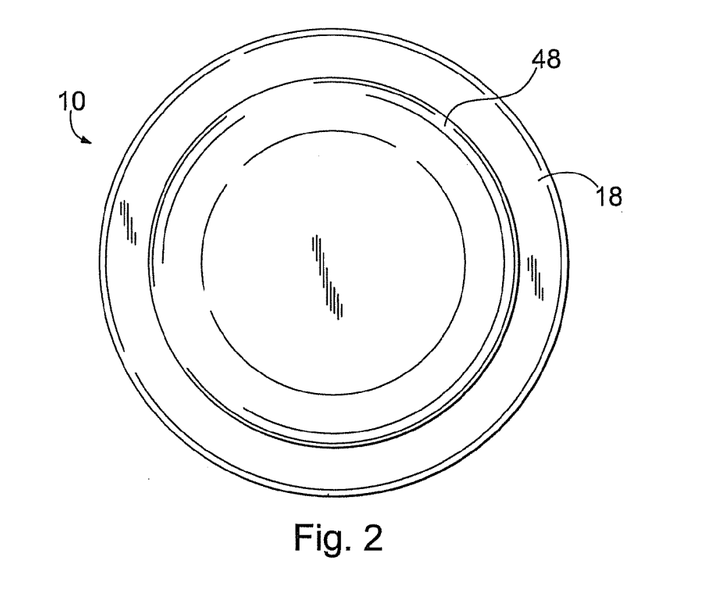
FIG. 2 is a top view of the injection training pad shown in FIG. 1.

A fully assembled embodiment of an injection training pad 10 is shown in FIGS. 1 and 2. The injection training pad includes a container 12, a lid 18, a retaining member 26, a cushion 42, and a cap 48. The lid 18 removably engages the container 12 and is positioned on top of the container 12. A portion of the cap 48, visible in FIGS. 1 and 2, is generally dome shaped and extends further upward beyond the lid 18.

Figure 3A:
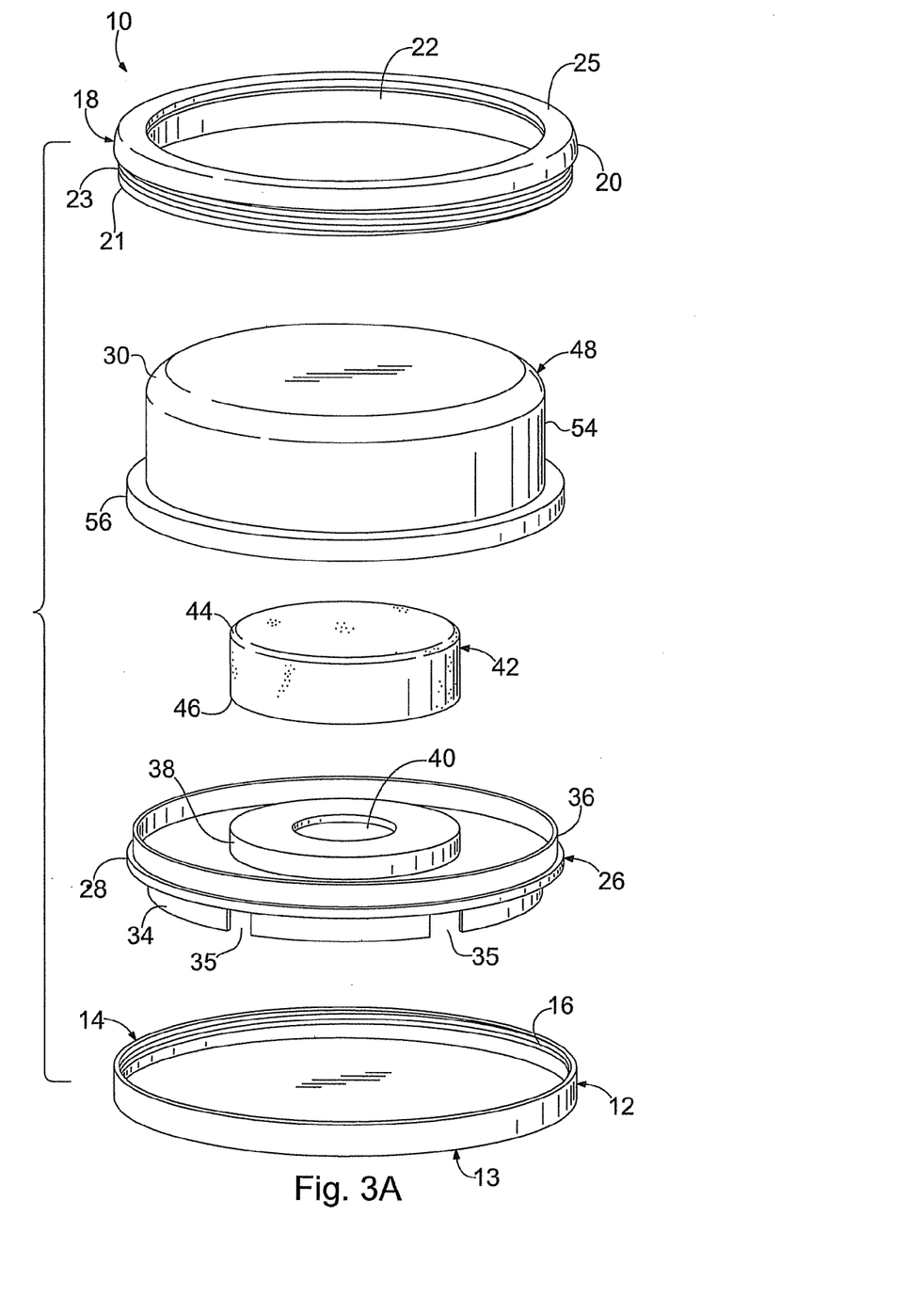
FIG. 3A is an exploded perspective view of the injection training pad shown in FIG. 1.
Figure 3B:
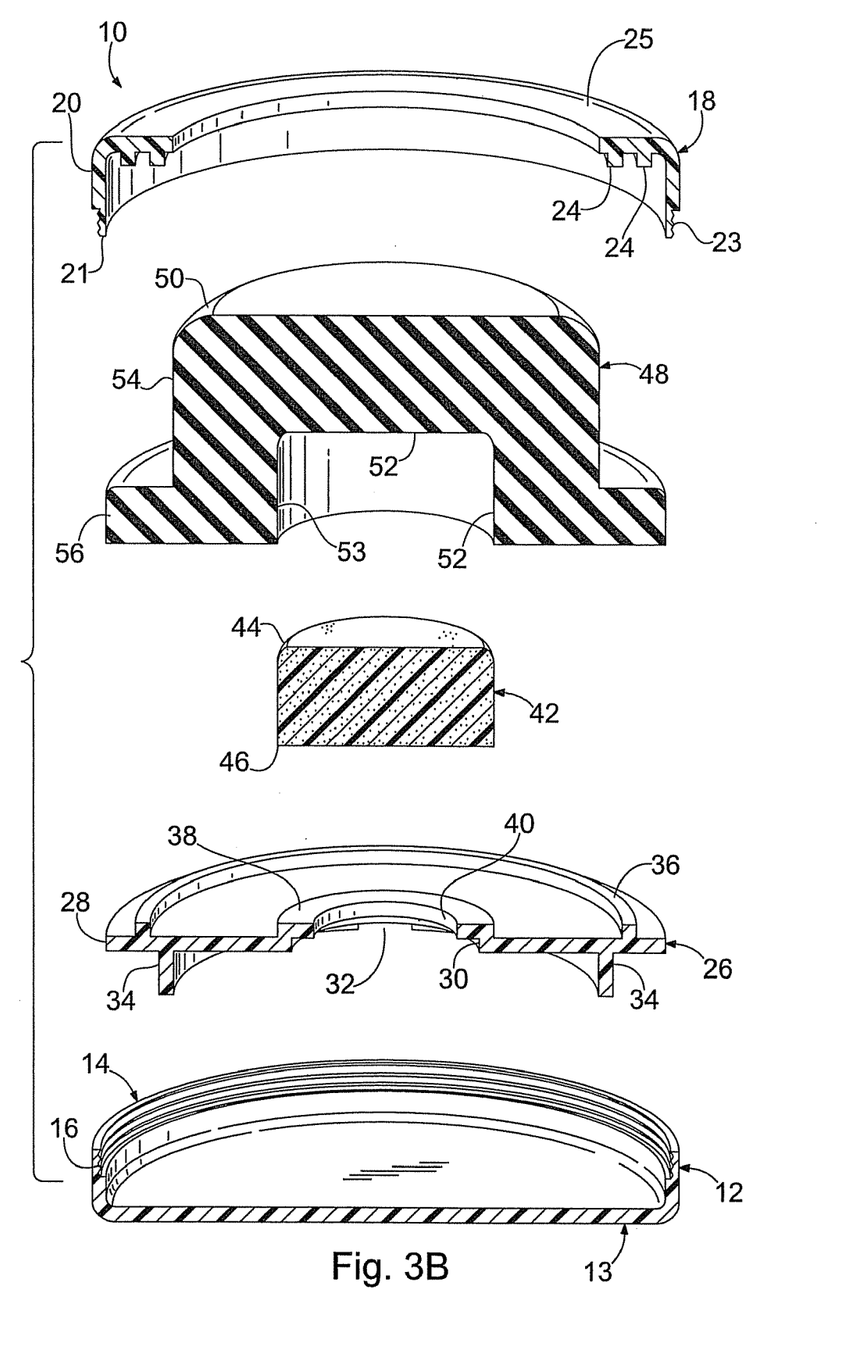
FIG. 3B is an exploded perspective sectional view of the injection training pad shown in FIG. 1.
Figure 4:
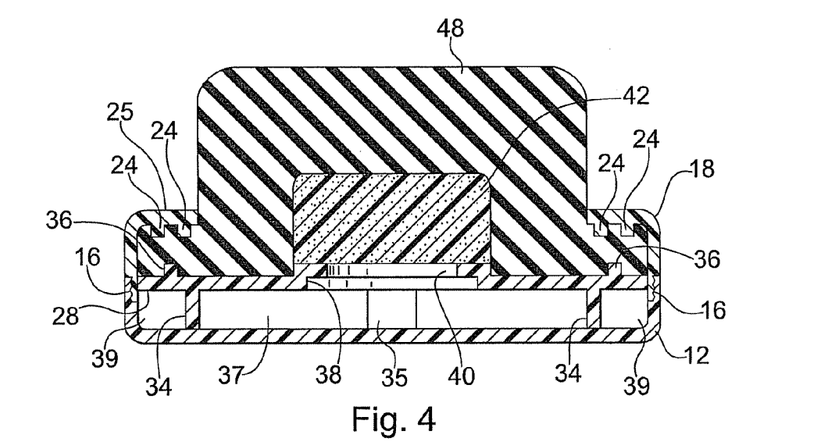
FIG. 4 is a sectional view of the injection training pad shown in FIG. 1.

Referring to FIGS. 3A, 3B and 4, the container 12 of the injection training pad 10 is cylindrically shaped with an open top 14 and a closed bottom 13. An inner portion of the open top 14 has a threaded portion 16. The container 12 can be made of a durable and nonporous material, such as plastic for its lightweight, moldable and sanitary properties.

The lid 18 of the injection training pad 10 is generally ring shaped having a top portion 25 and a cylindrical sidewall portion 20 that extends from the top portion 25. The sidewall portion 20 has a radius substantially equal to that of the outside edge of the container 12. The top portion 25 of the lid 18 has a hole 22 with a radius less than that of the sidewall portion 20. On the inside surface of the lid 18 there are two circular lips 24 extending downwardly from the top portion 25 of the lid 18. The circular lips 24 are of two distinct radii, both of which are greater than the radius of the hole 22, but less than the radius of the sidewall portion 20. As shown in FIG. 3A, the outer surface of the sidewall 20 has a threaded portion 23 that is configured to engage with the threaded portion 16 on the container 12 such that the lid 18 can be screwed onto the container 12. In certain embodiments, the open top 14 of the container 12 may be provided with the threaded portion 16 on the outer surface of the container 12 and the lid 18 may be provided with the threaded portion 23 on an inner surface of the sidewall 20. Although the lid 18 and the container 12 are shown with corresponding threaded portions (23, 16), any suitable arrangement may be used to removably secure the lid 18 to the container 12. For example, the sidewall 20 of the lid 18 may have a snap-fit or interference-fit with the open top 14 of the container 12. The lid 18 can be made of a durable and nonporous material, such as plastic for its lightweight, moldable and sanitary properties.

The retaining member 26 of the injection training pad 10 includes a circular washer-shaped base 28 having an inside edge 30 that defines a hole 32 in the center of the retaining member 26. Extending vertically downward from the base 28 are legs 34 that are positioned between the hole 32 and an outside edge of the base 28. The legs 34 are separated by gaps 35 that space the legs apart circumferentially. While the retaining member 26 as shown in FIG. 3A has four legs 34, the present invention may have one leg 34 to support the base 28 of the retaining member 26 in the horizontal position. For example, a single leg 34 in the shape of a "C" would suffice for the purpose of the present invention, and would define a single gap 35.

A circular lip 36 may extend from a top surface of the base 28 of the retaining member 26. The circular lip 36 may be concentric with the hole 32 and located at a radius that is greater than the radius of the inner lip 24 on the lid 18 but less than the outer lip 24 on the lid 18. A cylindrically-shaped platform 38 may extend vertically from the base 28. The cylindrically-shaped platform 38 has a hole 40 at least partially aligned with the hole 32 of the base 28 and having a radius less than that of the hole 32. The retaining member 26 can be made of a durable and nonporous material, such as plastic for its lightweight, moldable and sanitary properties.

The cushion 42 of the injection training pad 10 is substantially cylindrical having a radius substantially equal to that of the platform 38. The cushion 42 may have rounded or beveled edges 44 around the top of the cushion 42 but sharp edges 46 around the bottom of the cushion. The cushion 42 may be made of a solid piece of foam or a sponge-like material. Such materials are desirable due to their similarity to muscle tissue in terms of their texture and flexibility, as well as their ability to absorb and retain liquids.

The cap 48 of the injection training pad 10 is generally cylindrically shaped having a flange 56 with a top portion 50 extending from the flange 56. The top portion 50 may have a rounded or beveled edge. As shown in FIGS. 3B and 4, the cap 48 may have a cavity 53 defining an inner surface 52 and an outer surface 54. The cavity 53 may be sized to accommodate the cushion 42 and is rounded or beveled at the upper end to concavely conform to the rounded or beveled edges 44 at the top of the cushion 42. The flange 56 has an outer radius less than the radius of the inside surface of the lid 18 but greater than the radius of the lips 24 that extend downwardly from the horizontal sidewall portion of the lid 18. The cap 48 may be made from a flexible and nonporous material to simulate human skin, such as rubber or latex. Thermoplastic elastomer (TPE) is a desirable material for the cap 48 due to its having elastic properties which are similar to those of human skin. Also, there are fewer instances of persons having allergies to TPE as there are to latex, which makes latex somewhat less desirable than TPE.

As shown in FIGS. 3A, 3B and 4, the injection training pad 10 is assembled by inserting the retaining member 26 into the container 12 such that the bottoms of the legs 34 of the retaining member 26 are adjacent to the inner surface of the closed bottom 13 of the container 12. The legs 34 of the retaining member 26, when in place within the container 12, define an inner portion 37 and an outer portion 39 within the container 12. The cushion 42 is placed on top of the platform 38 of the retaining member 26 so that the cushion 42 is centered on the hole 40 of the platform 38. The cap 48 is then placed on top of the cushion 42 so that the cavity 53 receives the cushion 42 and the inner surface 52 of the cap 48 is adjacent to the cushion 42 along the sides, top and rounded or beveled top edge 44 of the cushion. The flange 56 of the cap 48 is positioned on top of the lip 36 of the retaining member 26. The lid 18 is positioned on top of the cap 48 such that the top portion 50 of the cap 48 extends through the hole 22 of the lid 18. The inner surface of the top portion 25 of the lid 18 engages and compresses the top of the flange 56. As the lid 18 compresses the flange 56, the lip 36 on the retaining member 26 will engage the bottom surface of the flange 56. While the lid 18 is compressing the flange 56, the lid 18 is also rotated so that the threaded portion 23 of the lid 18 engage the threaded portion 16 of the container 12.

Once fully assembled, the flange 56 is pinched between the lid 18 and the retaining member 26 by the lips 24 and 36. This pinching holds the cap 48 firmly in place so that it cannot be easily pulled out of the hole 22 in the lid 18. The pinching also ensures a seal to prevent fluids from escaping or entering the injection training pad 10 through the hole 22 of the lid 18. The pinching shown and described herein is accomplished with two lips 24, both above, and one lip 36 below the flange 56. However, such disclosure is not intended to be limiting. Other embodiments with variations in the number of lips or other means of depressing or engaging the flange 56 (such as using a plurality of spikes) and their respective locations will be obvious to those having ordinary skill in the art, and are regarded as being within the scope of the present invention.

Having the lid 18 screw into the container 12 prevents fluids from entering or escaping from the interior of the injection training pad 10 through the seal formed at the threads between the lid 18 and the container 12. This thread arrangement for attaching the lid 18 to the container 12 is desirable because it creates a tight seal that is unlikely to be accidentally broken, i.e., unscrewed. Although the present embodiment of the injection training pad 10 uses threaded portions on the lid 18 and the container 12 to form this seal, such disclosure is not intended to be limiting. Variations and other embodiments regarding the means of attaching the lid 18 to the container 12, such as having the lid 18 snap onto the container 12, can be utilized.

Figure 5:
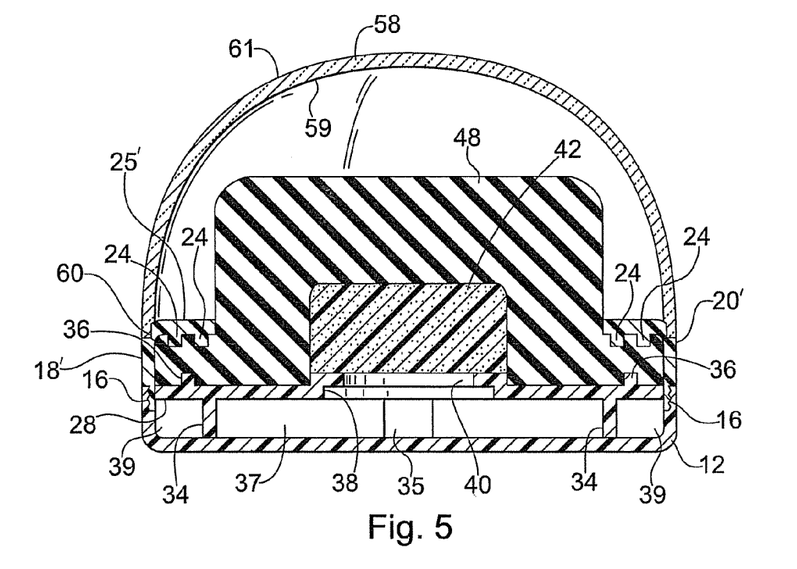
FIG. 5 is a sectional view of another embodiment of an injection training pad in accordance with the present invention.

As shown in FIG. 5, a guard 58 may be attached to a lid 18', which is similar to lid 18 except that the sidewall 20 and top portion 25 of the lid 18 have been routed out at the top such that a portion of a sidewall 20' and the top portion 25' define a recess for receiving the guard 58. The guard 58 is a substantially dome-shaped component with an inner surface 59 and outer surface 61. The outer surface 61 has a radius equal to that of the sidewall 20' of the lid 18'. The inner surface 59 may be routed out near the bottom of the guard 58 such that the inner radius of the guard 58 is greater near the bottom of the guard 58 than farther up on the guard 58. The guard 58 is attached to the lid 18' by placing it onto the lid 18' at a location 60 such that the routed portion of the lid 18' and the routed portion of the guard 58 are adjacent to each other. Although the guard 58 as shown in FIG. 5 is dome shaped and fits onto the lid 18' by virtue of the routed portions of the guard 58 and lid 18', such disclosure is not intended to be limiting. Variations and other embodiments regarding the shape of the guard 58 and how it attaches to the lid 18' may be used.

Figure 6:
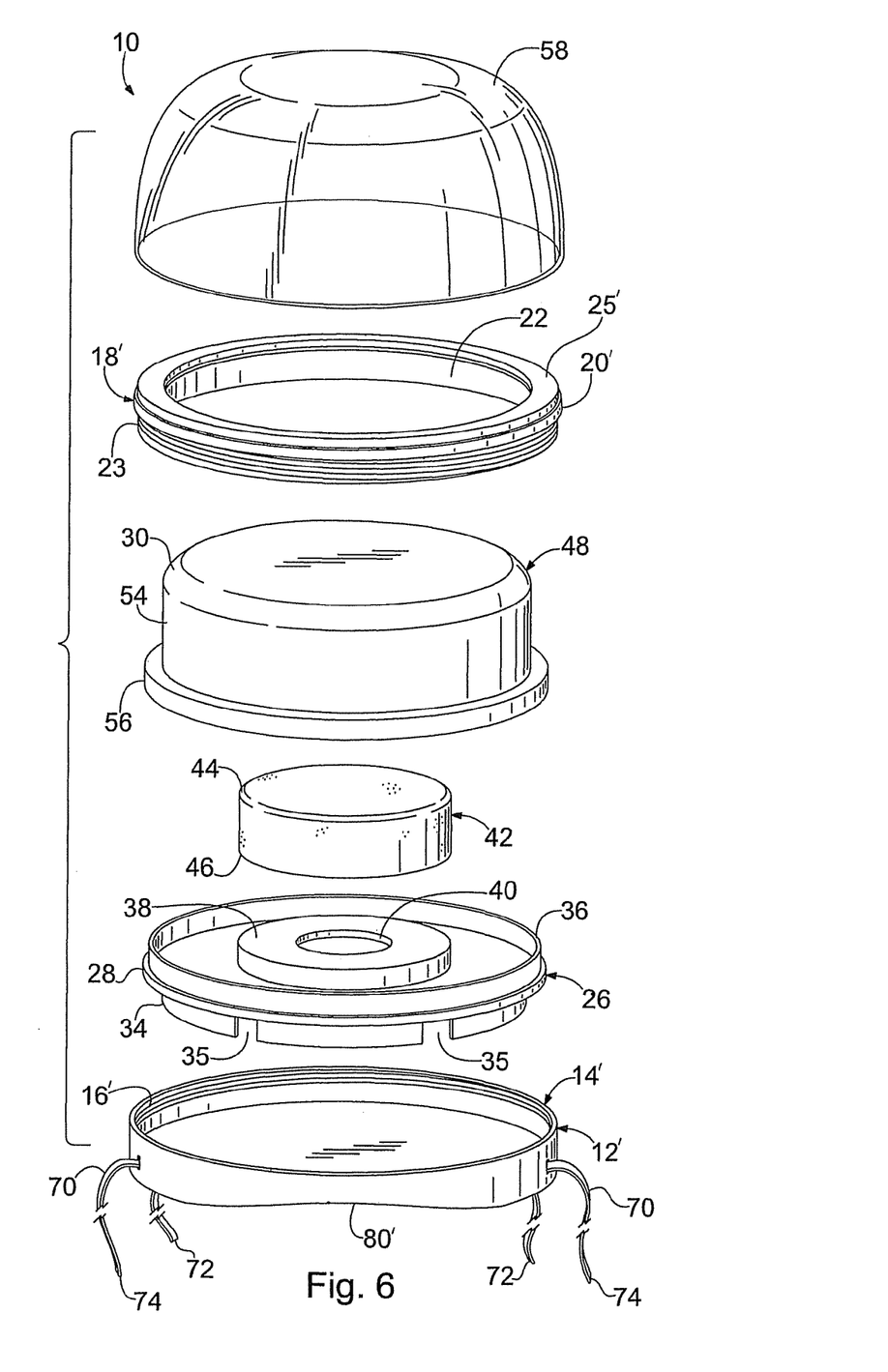
FIG. 6 is an exploded perspective view of a further embodiment of an injection training pad in accordance with the present invention.
Figure 7:
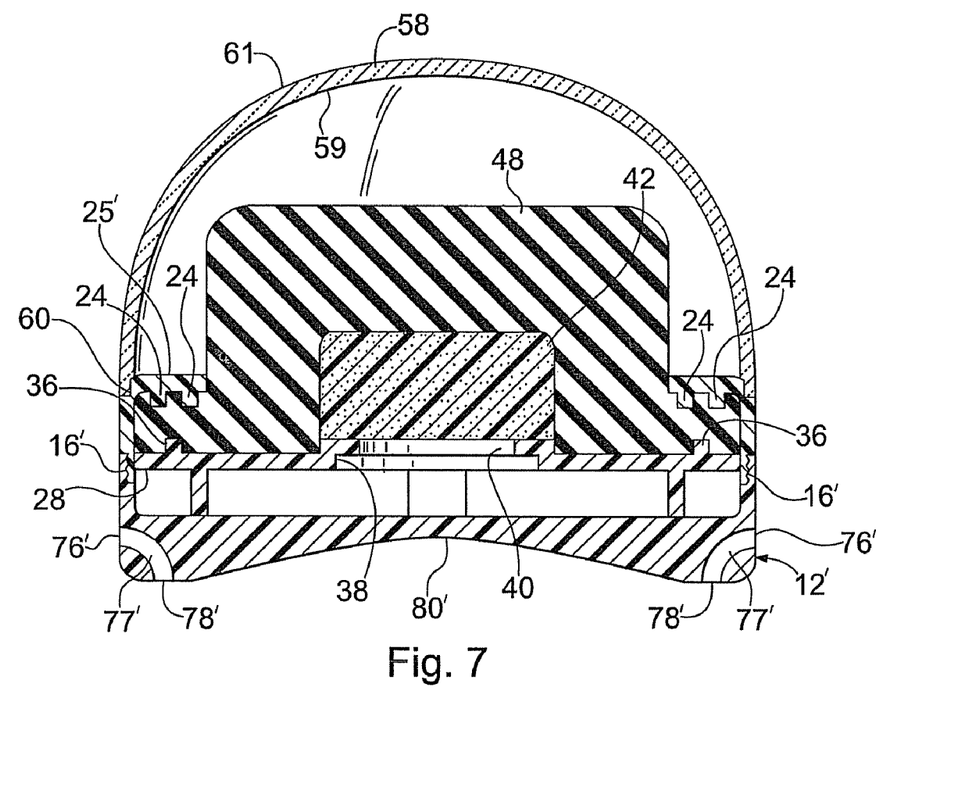
FIG. 7 is a sectional view of the injection training pad shown in FIG. 6.

As shown in FIGS. 6 and 7, a pair of straps 70 may be provided for a container 12', which is similar to container 12 except that the container 12' includes a curved closed bottom 80' and a passage 77' having a first opening 76' and a second opening 78'. A first end 72 of each strap 70 may inserted into the first opening 76' of the passage 77', through the passage 77', out the second opening 78' and secured to the body of each respective strap 70 via a hook and loop fastener (not shown) or any other suitable attachment arrangement. The closed bottom 80' of the container 12' is generally conformably-shaped to receive a leg or arm of a person. The container 12' may be firmly secured to the person by attaching a second end 74 of the strap to the strap 70 positioned on the opposite side of the container 12' via a hook and loop fastener or any other suitable attachment arrangement.

To use the injection training pad, a user sticks a needle or syringe downwardly into the cap 48. The cap 48 will be depressed by the pressure of the needle until the needle forces its way through the outer surface of the cap 48. Desirably, the thickness and elasticity of the cap 48 will be configured to closely simulate that of human skin so that the insertion of the needle feels like it would if it were being inserted into a human being, e.g., into an arm or leg. As the needle is inserted through the cap 48, the user can stop inserting the needle while the tip of the needle is inside the cap 48 and has not yet gone through the inner surface 52 of the cap 48. While the needle tip is positioned inside the cap 48 as such, a user can inject or pretend to inject fluid through the needle into the middle of the cap 48. Such an injection simulates an intradermal injection since it is performed as if the injection tales place within or between the layers of the skin.

The needle can also be inserted into the inner surface 52 of the cap 48 where the cap 48 meets the cushion 42. The user can then inject fluids or simulate fluid injection at that point. This simulates a subcutaneous injection, which takes place in the subcutaneous layer of the skin, below the dermis and epidermis layers, but above the underlying muscle tissue. Any fluid injected into this area where the inner surface 52 of the cap 48 meets the cushion 42 will be absorbed or soaked up into the cushion 42. If the cushion 42 becomes oversaturated by the fluid, excess fluid can collect along the top surface of the platform 38 and can flow down through the hole 40 in the platform 38, into the inner portion 37 of the container 12. Once in the inner portion 37 of the container 12, the fluid can flow along the bottom 13 of the container 12 and through the gaps 35 between the legs 34 of the retaining member 26 to collect in the outer portion 39 of the container 12.

The needle can also be inserted through the cap 48 and into the interior of the cushion 42, where the user can then inject or pretend to inject fluid. Such an injection simulates an intramuscular injection, where medicine is delivered directly into the muscle tissue. Desirably, the cushion 42 will be made of a material with an elasticity that closely simulates the density and feeling of human muscle tissue so that the user of the injection training pad 10 can get a sense of what force is required to stick a needle through the skin and into the muscle. Fluid injected into the interior of the cushion 42 will be absorbed or soaked up by the cushion 42. Excess fluid that oversaturates the cushion 42 can collect along the top surface of the platform 38, and can then flow down through the hole 40 in the platform 38 into the inner portion 37 of the container 12. Once in the inner portion 37 of the container 12, the fluid can flow along the bottom 13 of the container 12 and through the gaps 35 between the legs 34 of the retaining member 26 to collect in the outer portion 39 of the container 12.

If a user sticks the needle too far into the cushion 42, the tip of the needle may hit the top of the platform 38 or pass through the hole 40 of the retaining member 26 and hit the bottom of the container 12. This simulates the user sticking the needle too far into the muscle tissue so as to go through it and hit the underlying bone. Desirably, the cushion 42, as well as the platform 40 and legs 36 of the retaining member 26, should be configured so that the thickness of the cushion 42 approximates the thickness of muscle tissue on top of the bone tissue in a human. With such a configuration, users of the injection training pad can get a sense for how far into the muscle they can stick a needle before risking it hitting the bone.

After use, the injection training pad 10 can be disassembled by unscrewing the lid 18 from the container 12, then removing the cap 48, cushion 42 and retaining member 26 from the container 12. Any fluid that may have been absorbed into the cushion 42 can then be expunged by squeezing the cushion and allowing it to dry. Any fluid that collected in the container 12 can be spilled out. All components of the injection training pad 10 can thus be isolated for easy cleaning before reassembly.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. An injection training pad comprising:
   a container having an open top and a closed bottom;
   a lid having a hole, the lid being removably engaged with the open top of the container;
   a retaining member comprising a base with at least one leg, and at least a portion of the retaining member being disposed within the container;
   a cap having a flange, the flange positioned between the retaining member and the lid, the retaining member and the lid engaging the flange; and
   a cushion positioned between the retaining member and the cap.

2. The injection training pad of claim 1, wherein the lid further comprises a lip extending from an inner surface of a top portion of the lid.

3. The injection training pad of claim 1, wherein the retaining member further comprises a lip extending from a top surface of the base.

4. The injection training pad of claim 1, wherein the cap comprises a top portion extending from the flange through the hole of the lid.

5. The injection training pad of claim 4, wherein the injection training pad further comprises a guard removably engaged with a recess on a top surface of the lid, the guard enclosing the top portion of the cap.

6. The injection training pad of claim 1, wherein the base of the retaining member has a hole.

7. The injection training pad of claim 1, wherein the cap is made of a flexible, non-porous material to simulate human skin.

8. The injection training pad of claim 1, wherein the cap is made of a thermoplastic elastomer.

9. The injection training pad of claim 1, wherein the cushion is made of a solid piece of foam.

10. An injection training pad comprising:
    a container having an open top and a closed bottom;
    a lid having a hole, the lid being removably engaged with the open top of the container;
    a retaining member comprising a base with at least one leg, and at least a portion of the retaining member being disposed within the container;
    a cap having a flange and a cavity, the flange positioned between the retaining member and the lid, and the cavity defining an inner surface of the cap; and
    a cushion, wherein at least a portion of the cushion is disposed within the cavity adjacent to the inner surface of the cap.

11. The injection training pad of claim 10, wherein the base of the retaining member has a hole.

12. The injection training pad of claim 11, wherein the retaining member further comprises a platform extending from a top surface of the base, the platform having a hole at least partially aligned with the hole of the base.

13. The injection training pad of claim 10, wherein the lid further comprises a lip extending from an inner surface of a top portion of the lid.

14. The injection training pad of claim 10, wherein the retaining member further comprises a lip extending from a top surface of the base.

15. The injection training pad of claim 10, wherein the cap comprises a top portion extending from the flange through the hole of the lid.

16. The injection training pad of claim 15, wherein the injection training pad further comprises a guard removably engaged with a recess on a top surface of the lid, the guard enclosing the top portion of the cap.

17. The injection training pad of claim 10, wherein the cap is made of a flexible, non-porous material to simulate human skin.

18. The injection training pad of claim 10, wherein the cap is made of a thermoplastic elastomer.

19. The injection training pad of claim 10, wherein the cushion is made of a solid piece of foam.

* * * * *